(12) United States Patent
Kong et al.

(10) Patent No.: US 12,325,644 B2
(45) Date of Patent: Jun. 10, 2025

(54) NON-ELECTRIC WATER PURIFIER

(71) Applicant: Picogram Co., Ltd., Incheon (KR)

(72) Inventors: Jong Ho Kong, Seoul (KR); Hyun Sup Shin, Incheon (KR); Sung Taek Lim, Gimpo-si (KR)

(73) Assignee: Picogram Co., Ltd., Incheon (KR)

( * ) Notice: Subject to any disclaimer, the term of this patent is extended or adjusted under 35 U.S.C. 154(b) by 456 days.

(21) Appl. No.: 17/799,396

(22) PCT Filed: May 15, 2020

(86) PCT No.: PCT/KR2020/006466
§ 371 (c)(1),
(2) Date: Aug. 12, 2022

(87) PCT Pub. No.: WO2021/172658
PCT Pub. Date: Sep. 2, 2021

(65) Prior Publication Data
US 2023/0068681 A1    Mar. 2, 2023

(30) Foreign Application Priority Data

Feb. 24, 2020    (KR) ........................ 10-2020-0022073

(51) Int. Cl.
*C02F 1/00*    (2023.01)
(52) U.S. Cl.
CPC ........ *C02F 1/003* (2013.01); *C02F 2201/004* (2013.01); *C02F 2303/20* (2013.01); *C02F 2307/10* (2013.01)

(58) Field of Classification Search
CPC ...... C02F 1/004; C02F 1/005; C02F 2307/10; B01D 35/306; B01D 2201/301; B01D 2201/4023; B01D 2201/4038
See application file for complete search history.

(56) References Cited

FOREIGN PATENT DOCUMENTS

| | | | |
|---|---|---|---|
| CN | 204051209 U | * | 12/2014 |
| JP | 2006-747 A | | 1/2006 |
| KR | 10-2010-0050335 A | | 5/2010 |

(Continued)

OTHER PUBLICATIONS

English translation of CN 204051209 (Year: 2014).*

(Continued)

*Primary Examiner* — Benjamin M Kurtz
(74) *Attorney, Agent, or Firm* — Bret E. Field; Bozicevic, Field & Francis LLP

(57) ABSTRACT

Proposed is a non-electric water purifier in which a flow path provided between a water-purifying filter and a water outlet cock is replaced in order to minimize contamination of purified drinking water. The non-electric water purifier includes a main body having a door formed on one side thereof so as to open and close the main body and having and having a receiving space part defined therein, a connector which is coupled replaceably and rotatably to one side of the main body and incudes a raw water passage connected to a raw water inlet and a purified water passage through which purified water flows, at least one filter housing being received in the receiving space part, with a discharge outlet of the filter housing being coupled detachably to the connector, and the water outlet cock which is connected to a discharge opening of the connector and discharges purified water.

12 Claims, 12 Drawing Sheets

(56) References Cited

FOREIGN PATENT DOCUMENTS

| | | |
|---|---|---|
| KR | 10-2014-0057941 | 5/2014 |
| KR | 10-2016-0037712 | 4/2016 |
| KR | 10-2016-0050219 | 5/2016 |
| KR | 10-1987942 B1 | 6/2019 |
| WO | WO2021172658 A1 | 9/2021 |

OTHER PUBLICATIONS

English translation of KR 10-2016-0037712 (Year: 2016).*
International Search Report for PCT Application No. PCT/KR2020/006466 mailed Nov. 19, 2020, with its English translation, 5 pages.
First Office Action for Chinese Application No. 202080097403.6 mailed Apr. 28, 2023, with its English translation, 11 pages.
Second Office Action for Chinese Application No. 202080097403.6, mailed Oct. 26, 2023, with its English translation, 12 pages.
Grant Decision for Chinese Application No. 202080097403.6, mailed Mar. 21, 2024, with its English translation, 3 pages.
Office Action for Vietnamese Application No. 1-2022-05285 mailed Apr. 26, 2024, with its English translation, 4 pages.

\* cited by examiner

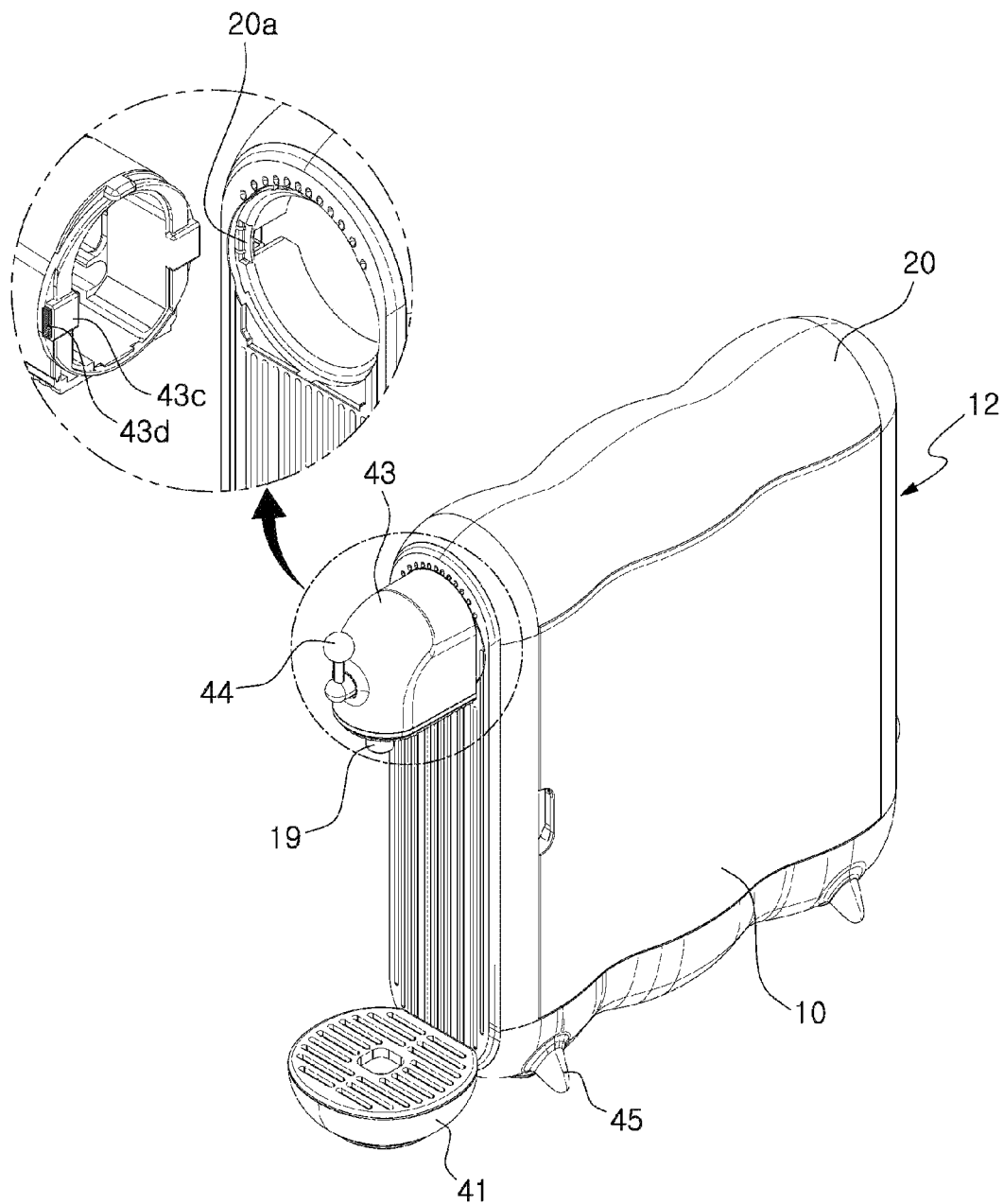
[FIG. 1]

[FIG. 2]
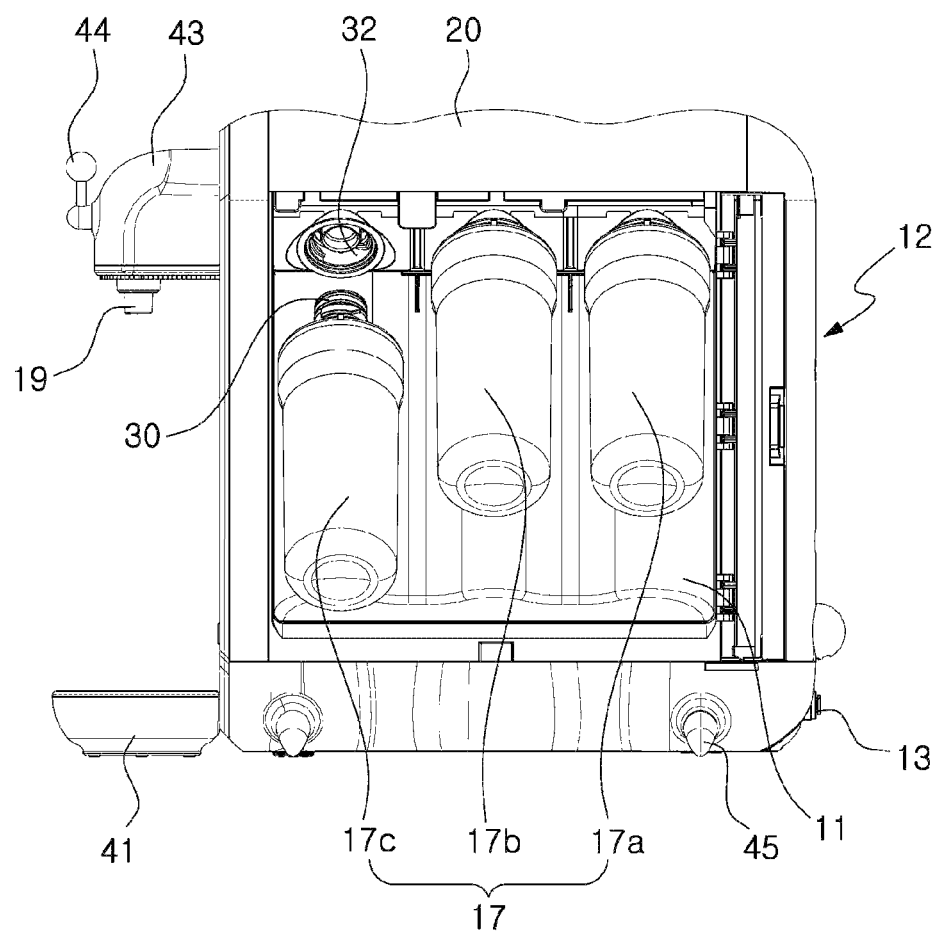

[FIG. 3]
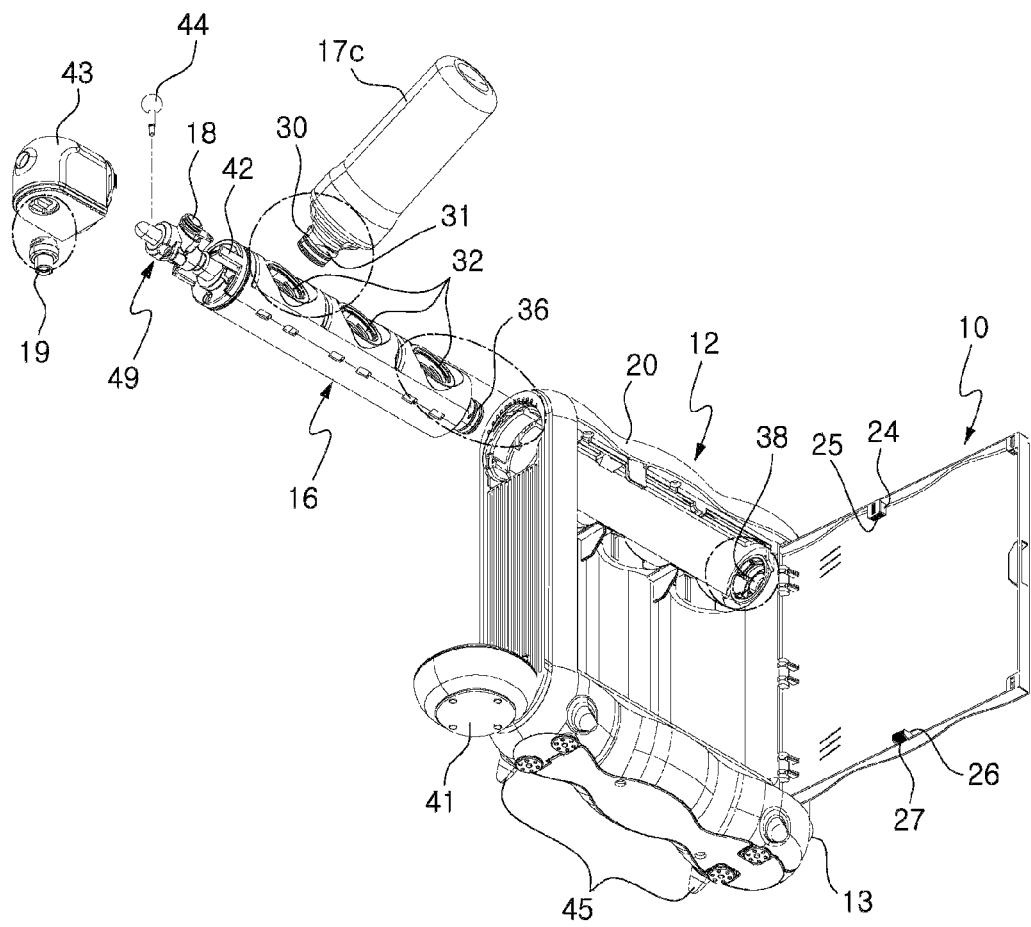

[FIG. 4]
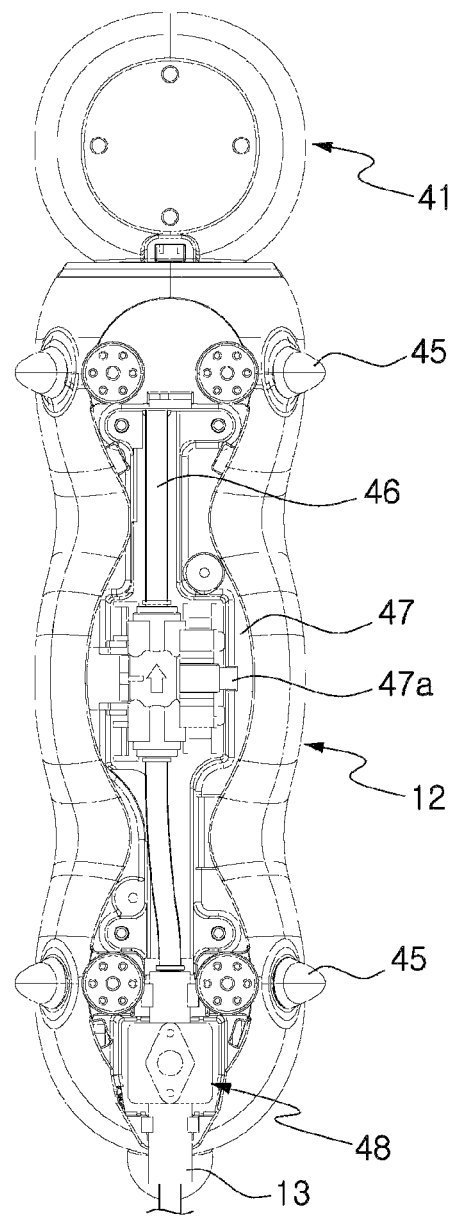

[FIG. 5]
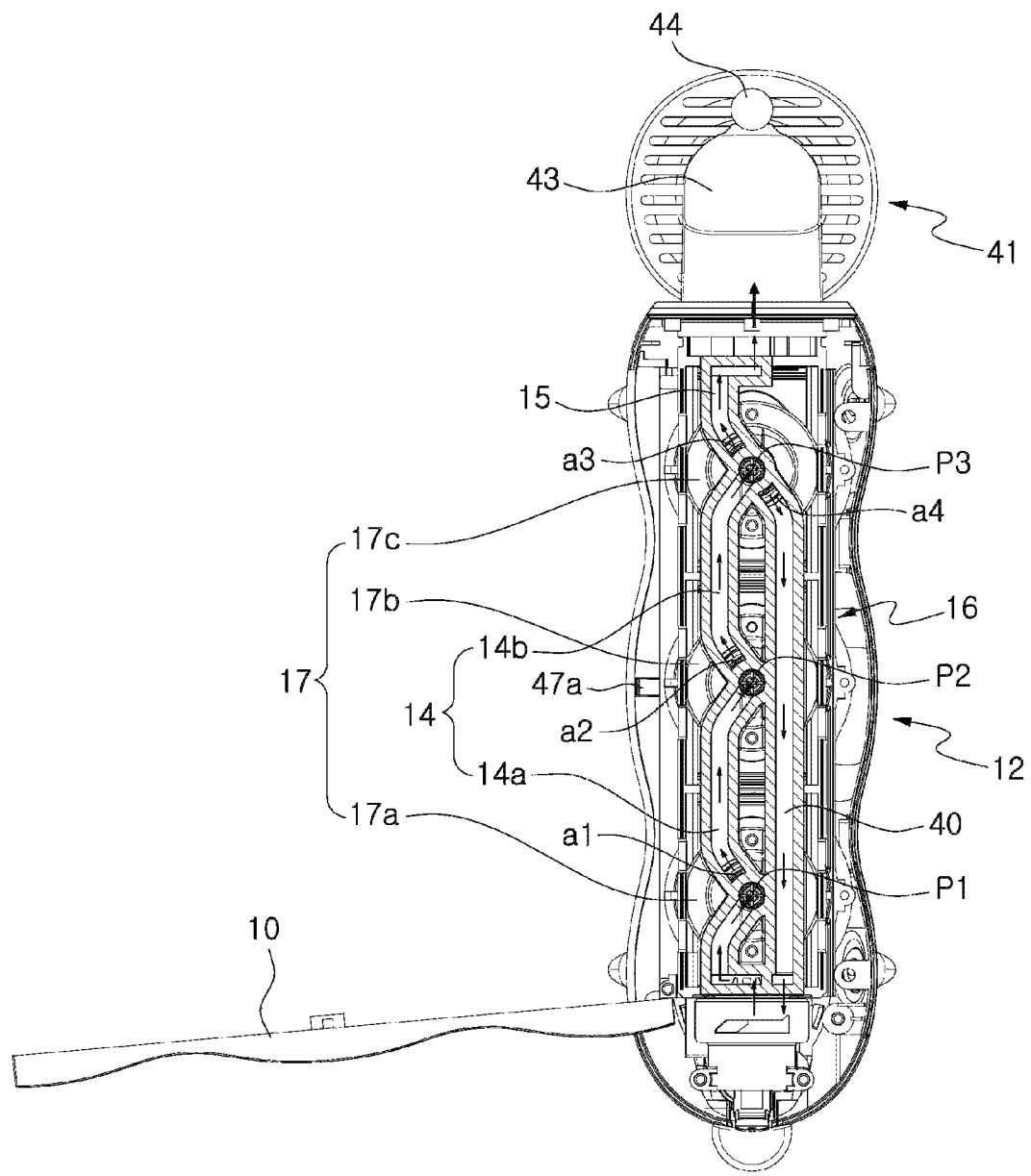

[FIG. 6a]
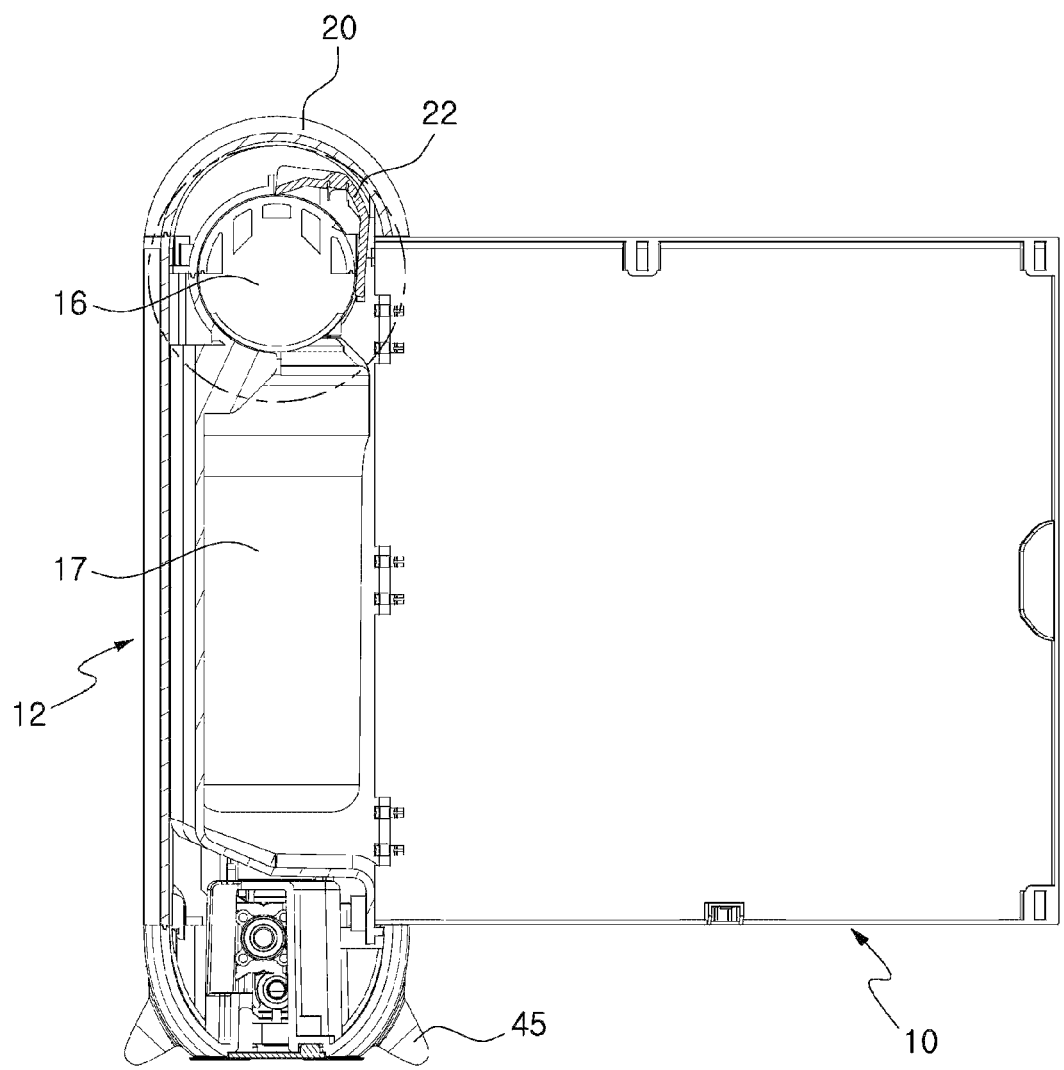

[FIG. 6b]
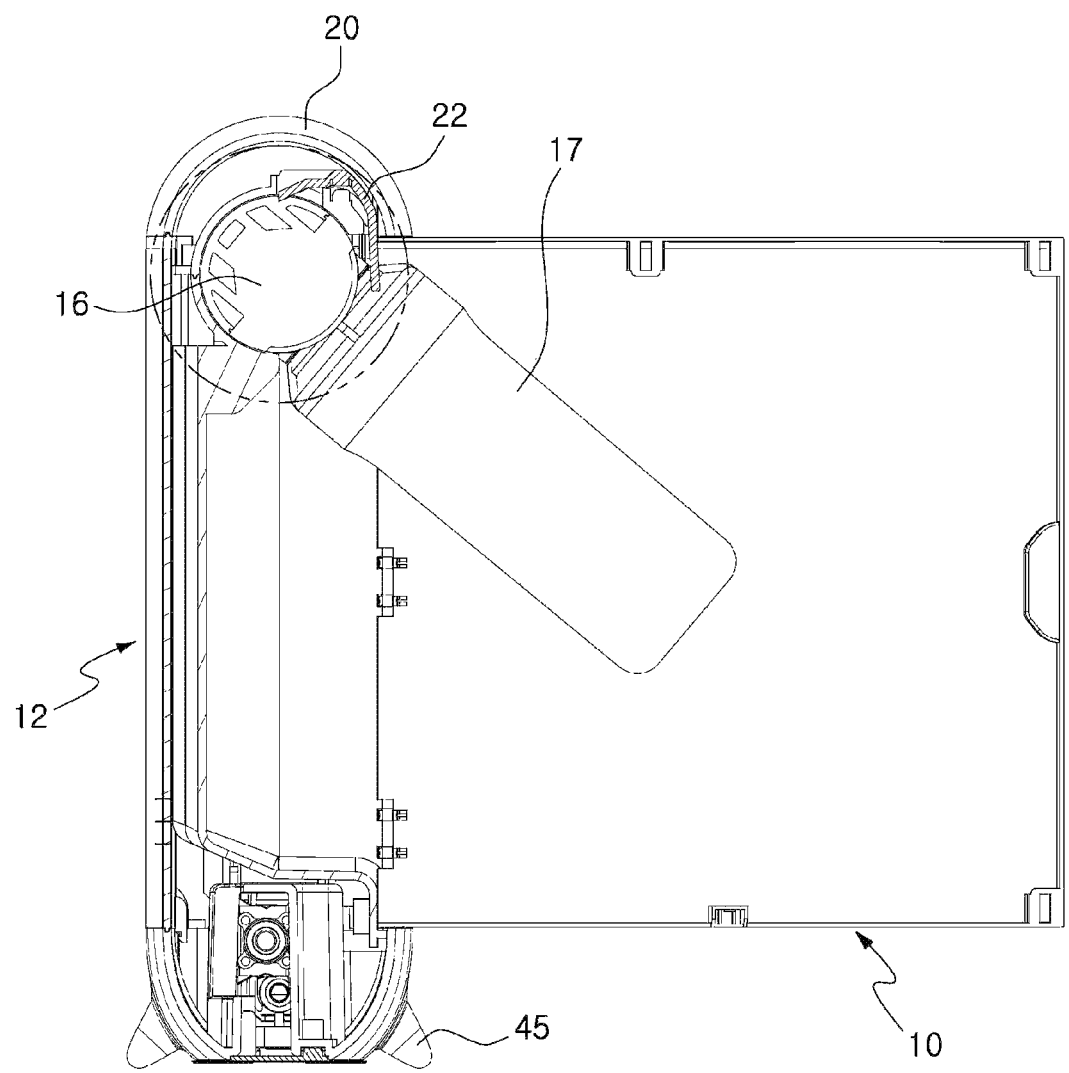

[FIG. 7a]
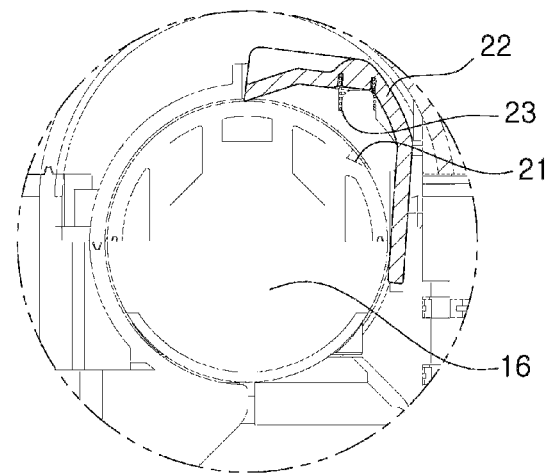
[FIG. 7b]
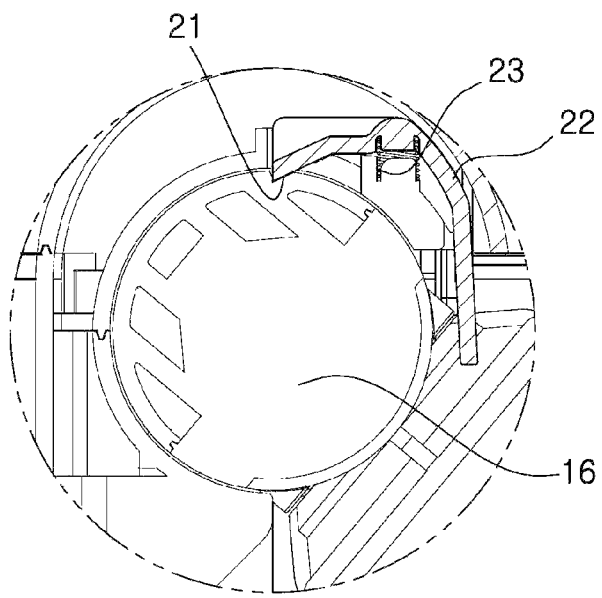

[FIG. 8a]
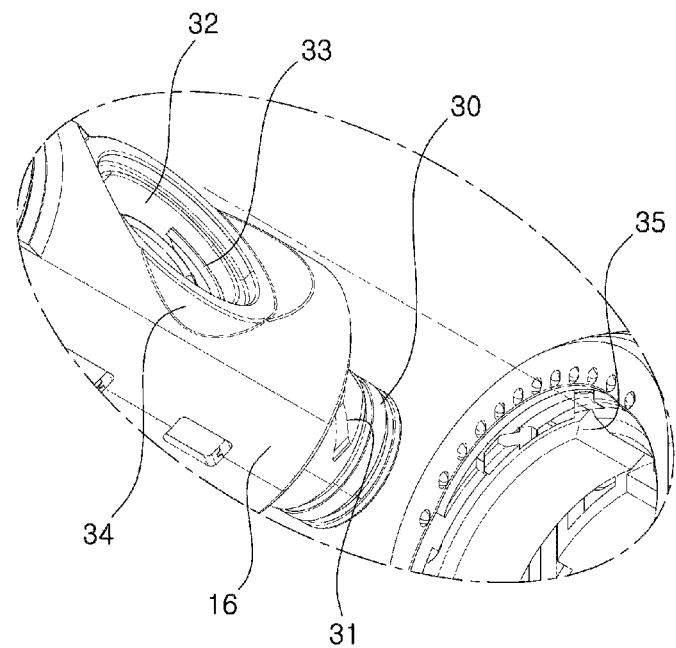
[FIG. 8b]
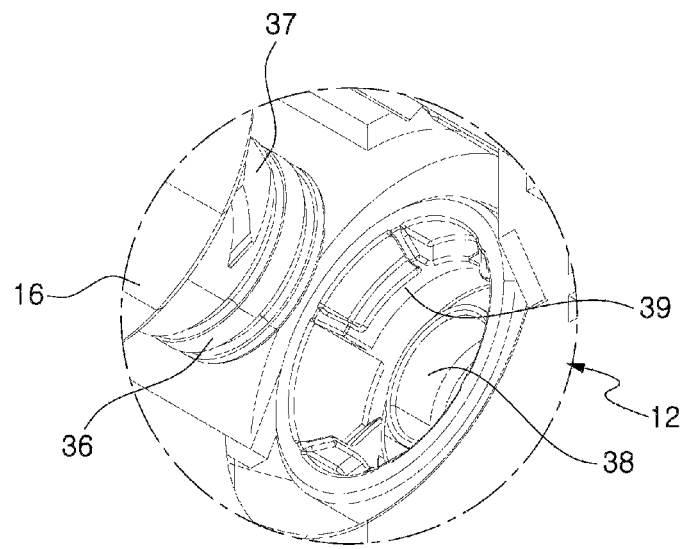

[FIG. 8c]
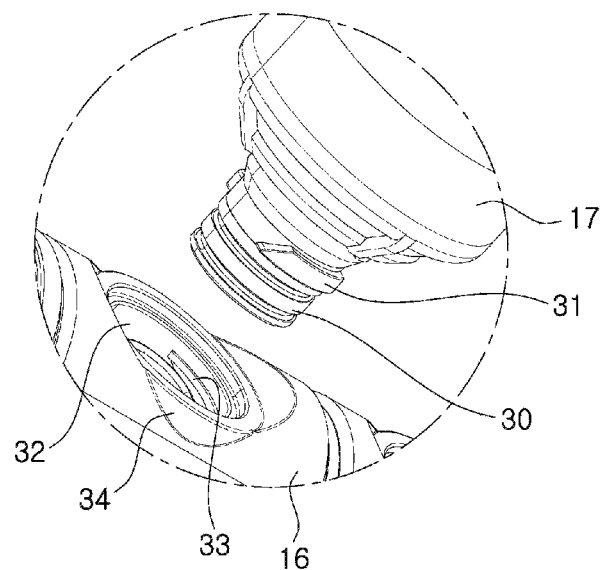
[FIG. 8d]
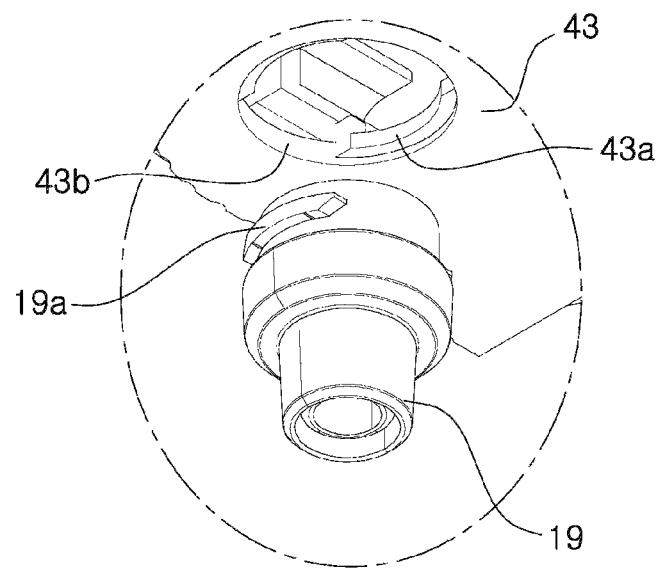

[FIG. 9]
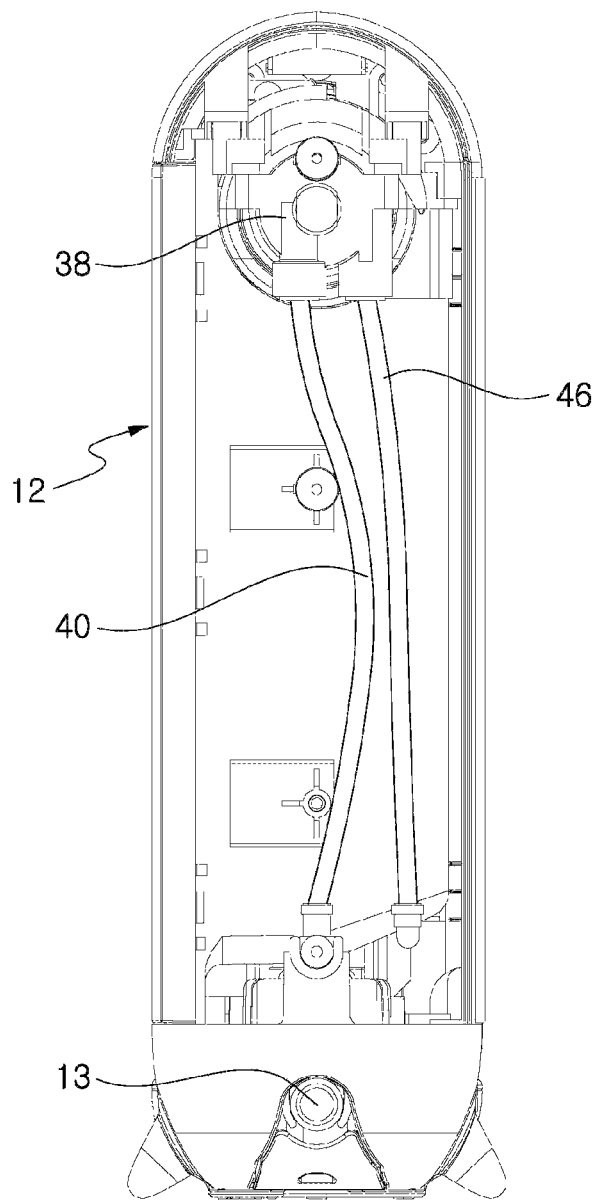

[FIG. 10]
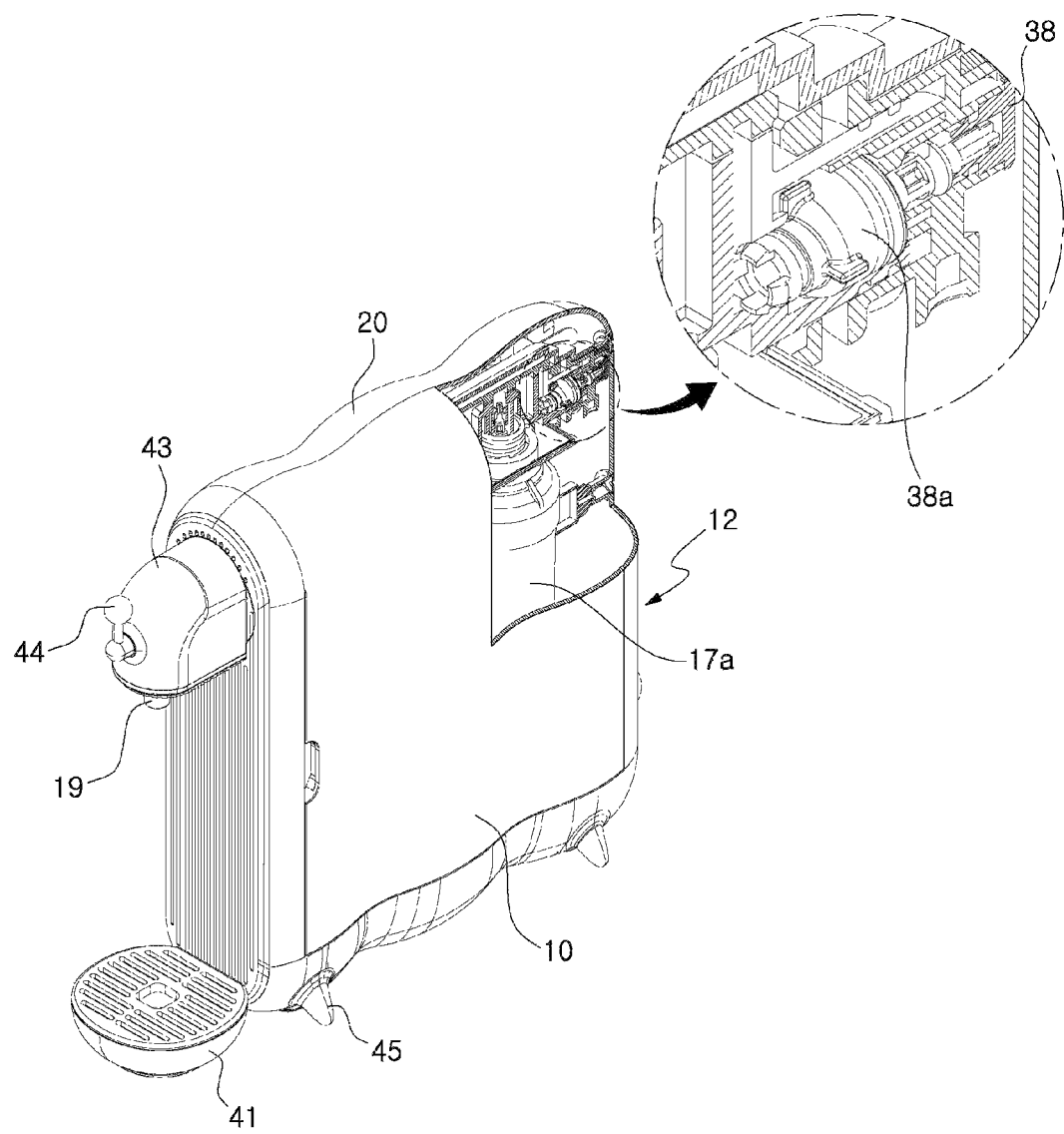

NON-ELECTRIC WATER PURIFIER

CROSS REFERENCE TO RELATED APPLICATION

This Application is a Section 371 National Stage Application of International Application No. PCT/KR2020/006466, filed May 15, 2020, the contents of which is hereby incorporated by reference in its entirety.

TECHNICAL FIELD

The present disclosure relates generally to a water purifier. More particularly, the present disclosure relates to a non-electric water purifier in which a flow path (refers to a connector) provided between a water-purifying filter and a water outlet cock is replaced so as to minimize contamination of purified drinking water.

BACKGROUND ART

Generally, unless otherwise indicated in the present specification, content described in this section is not a prior art to the claims of this application, and inclusion thereof in this section is not admitted to be a prior art.

Generally, in a water purifier, a water-purifying filter which purifies raw water such as tap water is used, and to prevent contaminants or bacteria, which are harmful to a human body, occurring inside a flow path under the water-purifying filter, the flow path is periodically replaced so as to secure water hygiene above a predetermined level.

Although not shown, when replacing a flow path under the water-purifying filter of a conventional water purifier, some parts of the flow path required to be replaced are disassembled and then fittings coupled to the parts are removed, and accordingly, each of the parts is required to be disassembled from each other and be replaced, so it takes too much work time and effort, and after the replacement of the parts of the flow path, water leakage may occur through connection portions between new parts.

Meanwhile, when a stainless steel pipe as the flow path under the water-purifying filter is used instead of a synthetic resin hose, high-temperature steam or a separate sterilizing agent is circulated at a predetermined cycle in the pipe to perform sterilization such that hygiene of purified water may be increased, but there is a limitation that contaminants or bacteria occurring in the flow path made of a stainless steel pipe cannot be completely sterilized.

A one-touch flow pipe replacement modular water purifier is disclosed in Korean Patent No. 10-1987942.

DISCLOSURE

Technical Problem

An embodiment of the present specification relates to a non-electric water purifier in which the entirety of a flow path (refers to a connector) provided between a water-purifying filter and a water outlet cock is replaced so as to prevent the contamination of purified water due to contaminants.

The embodiment of the present specification relates to a non-electric water purifier which allows user to directly replace the connector and the water-purifying filter in a one-touch method.

Technical Solution

In order to accomplish the above and other objectives of the present specification, according to an embodiment of the present specification, Proposed is a non-electric water purifier including: a main body having a door formed on one side thereof so as to open and close the main body and having a receiving space part defined therein;
- a connector which is coupled replaceably and rotatably to one side of the main body and includes a raw water passage connected to a raw water inlet and a purified water passage through which purified water flows;
- at least one filter housing being received in the receiving space part, with a discharge outlet of the filter housing being coupled detachably to the connector; and
- a water outlet cock which is connected to a discharge opening of the connector and discharges purified water.

Advantageous Effects

The non-electric water purifier having the above-described configuration according to the embodiment of the present specification has the following effects.

The entirety of a flow path (refers to the connector) provided between the water-purifying filter and the water outlet cock is replaced, thereby preventing the contamination of purified water due to foreign matter, harmful to a human body, such as contaminants or bacteria occurring inside the flow path.

In addition, the non-electric water purifier allows a user without professional knowledge on the water purifier to personally replace the connector and the water-purifying filter in a one-touch method, thereby providing convenience, practicality and reliability.

DESCRIPTION OF DRAWINGS

FIG. 1 is a perspective view of a non-electric water purifier according to an exemplary embodiment of the present specification, FIG. 2 is a view illustrating a state in which a door is opened in the water purifier illustrated in FIG. 1, FIG. 3 is a view illustrating a state in which a connector and a filter housing are separated from each other in the water purifier illustrated in FIG. 1, FIG. 4 is a bottom view of the water purifier illustrated in FIG. 1, FIG. 5 is a cross-sectional view illustrating the internal structure of the connector in the water purifier illustrated in FIG. 1, FIGS. 6a, 6b are views illustrating the attaching and detaching of the filter housing, respectively, in the water purifier illustrated in FIG. 1, FIGS. 7a, 7b are views illustrating the locking and unlocking of the connector, respectively, during the attaching and detaching of the filter housing illustrated in FIGS. 6a, 6b, FIGS. 8a, 8b, 8c, 8d are extended views of important parts of the water purifier illustrated in FIG. 1, FIG. 9 is a view illustrating a state in which a side cover is removed from the water purifier illustrated in FIG. 1, and FIG. 10 is a partially cut sectional view illustrating a state in which a check valve is coupled to a combination hole to which the connector is detachably coupled in the water purifier illustrated in FIG. 1.

DESCRIPTION OF THE REFERENCE NUMERALS IN THE DRAWINGS

10; Door
12; Min body
14; Raw water passage
16; Connector
18; Discharge opening
20; Upper cap
22; Stopper
24; First pocket
26; Second pocket
30; Discharge outlet
32; Coupling opening
34; Reinforcement jaw
36; Introduction opening
38; Combination hole
40; Purified water passage for a faucet
42; Handle
44; On/off valve manipulation lever
46; Raw water introduction tube

BEST MODE

Hereinafter, a non-electric water purifier according to an exemplary embodiment of the present specification will be described in detail with reference to the accompanying drawings.

Referring to FIGS. 1 to 10, the non-electric water purifier according to the embodiment of the present specification includes:
a main body 12 having a door 10 formed on one side thereof so as to open and close the main body 12, and having a receiving space part 11 defined therein;
a cylindrical connector 16 being coupled to one upper side of the main body 12 such that the connector 16 is replaceable and rotatable within a predetermined angle, the connector 16 having a raw water passage 14 formed on one side of the main body 12 and being connected to a raw water inlet 13 into which raw water such as tap water is introduced, and having a purified water passage 15 through which purified water flows;
at least one filter housing 17 being received in the receiving space part 11, with a nipple-shaped discharge outlet 30 of the filter housing 17 being coupled detachably to the connector 16, the filter housing 17 being configured to filter foreign matter contained in raw water introduced through the raw water inlet 13; and
a water outlet cock 19 which is connected to a discharge opening 18 of the connector 16 and discharges purified water.

According to a more exemplary embodiment, as illustrated in FIGS. 6a, 6b, 7a, and 7b, the non-electric water purifier further includes: an upper cap 20 formed in the main body 12 so as to cover the upper part of the connector 16 described above;
a stopper 22 formed rotatably in the upper cap 20 such that an inner end of the stopper 22 is detachably coupled to a holding groove 21 formed in an outer circumference of the connector 16, wherein the inner end of the stopper is removed from the holding groove 21 when pressing an outer end of the stopper; and
an elastic member 23 (as an example, a compression coil spring may be used) which elastically biases a middle side of the stopper 22 pressed outward to an initial state thereof such that the inner end is coupled to the holding groove 21.

Accordingly, the discharge outlet 30 is coupled to a coupling opening 32 of the connector 16 described above, and the filter housing 17 received in the receiving space part 11 of the main body 12 may be easily replaced.

Specifically, as illustrated in FIG. 6a, the inner end of the stopper 22 having an "L" shape formed rotatably in the upper cap 20 is removed from the holding groove 21 of the connector 16, and thus the filter housing 17 may be rotated within a predetermined angle.

As illustrated in FIG. 6b, when the filter housing 17 is gripped and is raised by being rotated relative to the connector 16, the inner end of the stopper 22 is coupled to the holding groove 21 of the connector 16.

Accordingly, the rotation of the connector 16 having the coupling opening 32 to which the discharge outlet 30 of the filter housing 17 is coupled stops, so the filter housing 17 stands toward the door 10 by being maintained at approximately 45 degrees (see FIG. 6b).

Accordingly, the filter housing 17 may be removed from the coupling opening 32 of the connector 16, or a new filter housing 17 may be coupled to the coupling opening 32.

When the outer end of the stopper 22 is pressed toward the connector 16 after the new filter housing 17 is coupled to the connector 16 as described above, the inner end of the stopper 22 is raised by the elastic restoring force of the elastic member 23 and is removed from the holding groove 21 of the connector 16.

Accordingly, when the filter housing 17 is gripped and rotated relative to the connector 16 to be lowered to the rear wall of the main body 12 (that is, in a direction away from the door 10), the filter housing 17 may be received in the receiving space part 11 (see FIG. 6a).

In this case, a technology in which the discharge outlet 30 of the filter housing 17 is detachably locked in the coupling opening 32 of the connector 16 due to the structures of first lockers 31 formed on the discharge outlet 30 of the filter housing 17 described above and second lockers 33, which correspond to the first lockers 31, formed on the coupling opening 32 of the connector 16 is generally used in a technical field to which the present specification belongs, SO detailed description of configurations thereof will be omitted.

As illustrated in FIG. 3, the non-electric water purifier further includes at least one first pocket 24 formed on the inner surface of the door 10 described above, and
a magnetic body 25 received in the first pocket 24 so as to maintain a state in which the door 10 closes the main body 12.

Accordingly, when the door 10 closes the main body 12, the door 10 may be prevented from being opened arbitrarily due to the magnetic body 25 received in the first pocket 24 formed on the edge of the door 10.

As illustrated in FIGS. 4 and 5, the non-electric water purifier further includes a magnetic body 27 received in a second pocket 26 formed on one side of the inner surface of the door 10 described above, and
a solenoid valve 47 formed in a raw water introduction tube 46 provided between the raw water inlet 13 and the raw water passage 14 so as to open and close the raw water introduction tube 46,
wherein when the magnetic body exceeds a preset distance from a plunger 47a of the solenoid valve 47 due to the opening of the door 10, the plunger 47a is switched to a close mode so as to close the raw water introduction tube 46, and when the magnetic body 27 is within the preset distance from the plunger 47a due to the closing of the door 10, the plunger 47*a* is switched to an open mode so as to open the raw water introduction tube 46.

Accordingly, when opening the door 10 so as to replace the filter housing 17 described above, the raw water introduction tube 46 is automatically closed by the solenoid valve 47 switched to the close mode, which may provide convenience to a user.

In this case, the technology of opening or closing the raw water introduction tube 46 by the solenoid valve 47 switched to the open mode or the close mode when the magnetic body 27 exceeds or is within a preset distance from the solenoid valve 47 according to the opening or closing of the door 10 described above is used in the technical field to which the present specification belongs, so detailed description of configurations thereof will be omitted.

As illustrated in FIGS. 3 and 8*c*, as for the coupling method of the filter housing 17 in which the discharge outlet 30 is detachably locked in the connector 16 described above, the water purifier further includes the wing-shaped first lockers 31 formed symmetrically to each other on the outer surface of the discharge outlet 30 of the filter housing 17, and the wing-shaped second lockers 33 formed symmetrically to each other on the inner surface of the coupling opening 32 of the connector 16 to which the discharge outlet 30 is coupled, wherein the coupling method of the filter housing is a rotational coupling method in which the wing-shaped first lockers 31 are detachably locked in the wing-shaped second lockers 33 when the filter housing 17 is rotated at a predetermined angle in a state in which the discharge outlet 30 of the filter housing 17 is inserted into the coupling opening 32 of the connector 16.

Accordingly, when the filter housing 17 is rotated within a predetermined angle after the discharge outlet 30 of the filter housing 17, which corresponds to the coupling opening 32, is coupled to the coupling opening 32 of the connector 16 described above, the wing-shaped first lockers 31 of the filter housing 17 are locked by the wing-shaped second lockers 33 of the connector 16 corresponding thereto.

In this case, a technology in which when attaching or detaching the filter housing 17 to or from the connector 16, the filter housing 17 is detachably locked in the connector 16 in a one-touch method due to the structures of the wing-shaped first lockers 31 of the filter housing 17 and the wing-shaped second lockers 33 of the connector 16 corresponding thereto is generally used in the technical field to which the present specification belongs, SO detailed description of configurations thereof will be omitted.

Although not shown, as for the coupling method of the filter housing 17 detachably locked in the connector 16 described above, the water purifier further includes: a push button (not shown) formed on one side of the outer surface of the connector 16;

a pair of lockers (not shown) formed in the coupling opening 32 of the connector 16 such that each of the lockers is moved radially outward according to the pressing of the push button; and an annular holding jaw which is formed on the outer surface of the discharge outlet 30 of the filter housing 17 and is detachably locked by the lockers, wherein the coupling method of the filter housing is a push button type coupling method.

Accordingly, when coupling the discharge outlet 30 of the filter housing 17, which corresponds to the coupling opening 32, to the coupling opening 32 of the connector 16 described above, each of the lockers formed on the coupling opening 32 of the connector 16 is moved outward and then is returned to an initial state by the elastic restoring force of the elastic member and thus may lock the holding jaw formed on the discharge outlet 30 of the filter housing 17.

In this case, a technology in which when attaching or detaching the filter housing 17 to or from the connector 16 described above, the filter housing 17 is detachably locked in the connector 16 in a one-touch method due to the structures of the annular holding jaw of the filter housing 17 and the lockers of the connector 16 corresponding thereto is generally used in the technical field to which the present specification belongs, so detailed description of configurations thereof will be omitted.

As illustrated in FIGS. 3 and 8*a*, the non-electric water purifier further includes guide grooves 35 formed to face each other in the entrance side of the upper cap 20 such that each of the guide grooves 35 corresponds to a reinforcement jaw 34 formed by protruding on the outer side of the coupling opening 32 of the connector 16 described above, the guide grooves 35 guiding the direction of the coupling of the connector 16 to the upper cap 20 when coupling the connector 16 to the upper cap 20.

Accordingly, when the connector 16 is inserted into the entrance of the upper cap 20 so as to couple an introduction opening 36 of the connector 16 to a combination hole 38 of the main body 12 described above, the reinforcement jaw 34 formed by protruding on the outer surface of the cylindrical connector 16 passes through the guide grooves 35 formed to face each other in the entrance side of the upper cap 20 such that each of the guide grooves 35 corresponds to the reinforcement jaw 34 so as to be easily inserted into the upper cap 20.

As illustrated in FIGS. 3 and 8*b*, as for a coupling method of the connector 16 locked replaceably in the main body 12 described above, the water purifier further includes wing-shaped third lockers 37 formed symmetrically to each other on the outer surface of the introduction opening 36 of the connector 16, and wing-shaped fourth lockers 39 formed to face each other on the inner surface of the boss-shaped combination hole 38 of the main body 12 to which the introduction opening 36 of the connector 16 is coupled, wherein the coupling method of the connector is a rotational coupling method in which the wing-shaped third lockers 37 are detachably locked in the wing-shaped fourth lockers 39 when the connector 16 is rotated at a predetermined angle in a state in which the introduction opening 36 of the connector 16 passes through the entrance of the upper cap 20 and is coupled to the combination hole 38 of the main body 12.

Accordingly, when the connector 16 is rotated at a predetermined angle after the introduction opening 36 of the connector 16 described above passes through the entrance of the upper cap 20 and is inserted into the combination hole 38 formed in the main body 12, the connector 16 is locked in the main body 12 by the wing-shaped third lockers 37, which are formed on the outer surface of the introduction opening 36, and the wing-shaped fourth lockers 39, which correspond to the wing-shaped third lockers 37 and are formed on the inner surface of the combination hole 38 of the main body 12.

In this case, a technology in which when attaching or detaching the introduction opening 36 of the connector 16 to or from the combination hole 38 of the main body 12, the connector 16 is detachably locked in the main body 12 in a one-touch method due to the structures of the wing-shaped third lockers 37 of the connector 16 and the wing-shaped fourth lockers 39 of the main body 12 corresponding thereto is generally used in the technical field to which the present specification belongs, so detailed description of configurations thereof will be omitted.

As illustrated in FIG. 5, the connector 16 described above further includes a purified water passage 40 for a faucet connected to the purified water passage 15 by branching therefrom so as to discharge purified water to a faucet.

Accordingly, a portion of water purified by a water-purifying filter of the filter housing 17 described above may be discharged through the purified water passage 15 and the water outlet cock 19 to be drunk.

In addition, a portion of water purified by the water-purifying filter of the filter housing 17 is discharged through the purified water passage 40 for a faucet connected to the purified water passage 15 by branching therefrom and is used as cooking water, thereby providing convenience and practicality to a user.

As illustrated in FIGS. 1 to 5, the non-electric water purifier further includes a tray 41 detachably formed one side surface of the main body 12 described above, the tray being configured to collect purified water which falls in the form of water droplets after the purified water is discharged from the water outlet cock 19.

Accordingly, when a user drinks purified water by discharging the purified water through the water outlet cock 19 described above, the tray collects purified water which falls in the form of water droplets from the water outlet cock 19 so as to pour the collected purified water into a sink, thereby preventing the contamination of the surroundings.

As illustrated in FIG. 3, the connector 16 described above further includes a handle 42 formed on one side surface of the connector 16 by protruding therefrom and configured to be gripped when the connector 16 is coupled to or removed from the upper cap 20.

Accordingly, when coupling or removing the connector 16 to or from the combination hole 38 of the main body 12 by rotating the connector 16 at a predetermined angle after inserting the connector 16 into the upper cap 20, the handle 42 formed on a side of the discharge opening 18 of the connector 16 may be gripped such that the connector 16 may be easily pushed into or pulled out of the upper cap 20.

Although not shown, the non-electric water purifier further includes a check valve 38a formed in the combination hole 38 of the main body 12 to which the introduction opening 36 of the connector 16 described above is detachably coupled, the check valve 38a preventing leakage of raw water when removing the connector 16 from the combination hole 38.

Accordingly, when removing the connector 16 from the main body as to replace the connector 16, the discharge side of the raw water introduction tube 46 is blocked by the check valve 38a installed in the combination hole 38, so contamination caused by raw water leaking in the main body 12 may be prevented.

In the drawings, reference numeral 43, which is not explained, indicates a water outlet cock cap coupled detachably to the entrance side of the upper cap 20, reference numeral 44 indicates an on/off valve manipulation lever controlling the discharge of purified water through the water outlet cock 19, reference numeral 45 indicates legs supporting the main body 12 standing on a kitchen sink, and reference numeral 50 indicates an O ring mounted to the entrance side of the connector 16 and supporting the connector 16 coupled to the upper cap 20.

Hereinafter, the example of use of the non-electric water purifier according to the embodiment of the present specification will be described with reference to the accompanying drawings.

As illustrated in FIGS. 1 to 10, raw water such as tap water passes sequentially through the raw water inlet 13, a pressure reducing valve, the raw water introduction tube 46, and the opened solenoid valve 47, which are formed at one side of the lower part of the main body 12, and then flows to the connector 16 through the combination hole 38 which is formed in the main body 12 and is combined with the introduction opening 36 of the connector 16.

Three filter housings 17 (17a, 17b, and 17c) are coupled to the connector 16 described above and are received in the receiving space part 11 of the main body 12. For an example, in FIG. 2, the filter housing 17a is received in the right side of the receiving space part 11, and the filter housing 17c is received in the left side of the receiving space part 11 (refers to a side toward the water outlet cock 19).

Raw water flowing to the connector 16 described above is introduced to the inside of a water-purifying filter of the filter housing 17a through an introduction port P1 formed in the center of the discharge outlet 30 of the filter housing 17a, and thus foreign matter harmful to a human body contained in raw water is purified by the water-purifying filter (not shown).

Purified water purified first by the water-purifying filter of the filter housing 17a is discharged through a formed on the outer side of the discharge port a1 introduction port P1 and flows to a raw water passage 14a.

The first purified water flowing to the raw water passage 14a is introduced to the inside of a water-purifying filter of the filter housing 17b through an introduction port P2, which communicates with the raw water passage 14a, formed in the center of the discharge outlet 30 of the filter housing 17b. Accordingly, the purified water flowing after the first purification is purified second by the water-purifying filter (not shown) of the filter housing 17b.

The purified water purified second by the water-purifying filter of the filter housing 17b is discharged through a discharge port a2 formed on the outer side of the introduction port P2 and flows to the raw water passage 14b.

The second purified water flowing to the raw water passage 14b is introduced to the inside of the water-purifying filter of the filter housing 17c through an introduction port P3, which communicates with the raw water passage 14b, formed in the center of the discharge outlet 30 of the filter housing 17c. Accordingly, the purified water flowing after the second purification is purified third by the water-purifying filter (not shown) of the filter housing 17c.

The purified water purified third by the water-purifying filter of the filter housing 17c is discharged through a discharge port a3 formed in the outer side of the introduction port P3 and flows to the purified water passage 15 which communicates with the discharge port a3.

After the purified water flowing to the purified water passage 15 flows to an on/off valve 49 formed in the discharge opening 18 of the connector 16, the on/off valve manipulation lever 44 is manipulated to an open position by a user so as to change the on/off valve 49 to an open state, so the purified water may be discharged through the water outlet cock 19 connected to the discharge opening 18.

Accordingly, a user may drink purified water discharged through the water outlet cock 19 by using a cup (not shown).

Meanwhile, the third purified water discharged through the discharge port a3 is discharged through the purified water passage 40 for a faucet which communicates with the discharge port a3 and thus may be used as cooking water.

As described above, when the connector 16, which is made of synthetic resin, to which the three-stage filter housings 17 are detachably coupled is used repeatedly, contaminants may occur in the raw water passage 14 and the purified water passage 15 formed in the connector 16 and thus bacteria harmful to a human body may multiply.

In this case, the entirety of the connector 16 may be removed from the main body 12 and be replaced with a new connector such that a user is protected from a pollution source.

To describe this in detail, the filter housing 17 is removed from the connector 16 coupled to the upper cap 20 described above.

As illustrated in FIGS. 1, 3, and 8d, a wing-shaped locker 19a formed on the upper part of the outer surface of the water outlet cock 19 may be unlocked from a wing-shaped locker 43a, which corresponds to the wing-shaped locker 19a, formed on the inner circumference of a through hole 43b formed on the bottom surface of the water outlet cock cap 43 by rotating the water outlet cock 19 at a predetermined angle. Accordingly, the water outlet cock 19 may be removed from the water outlet cock cap 43.

Next, the on/off valve manipulation lever 44 screwed to the on/off valve 49 may be removed from the on/off valve 49.

Accordingly, the water outlet cock cap 43 in close contact with the entrance side of the upper cap 20 may be removed therefrom in a one-touch method by being pulled outward. That is, as a magnetic body 43d received in a pocket 43c formed on the close contact surface of an opening part of the water outlet cock cap 43 loses magnetism thereof, the water outlet cock cap 43 may be removed from the upper cap 20.

After the water outlet cock cap 43 is removed from the upper cap 20 as described above, the connector 16 is rotated in one direction within a predetermined angle range by gripping the handle 42 formed on the outer end (a side opposite to the introduction opening 36) of the connector 16, and in this case, the introduction opening 36 of the connector 16 locked in the combination hole 38 of the main body 12 may be unlocked therefrom by the third and fourth lockers 37 and 39.

Accordingly, when the entirety of the connector 16 is pulled to the entrance side of the upper cap 20, the connector 16 may be removed from the main body 12.

After removing the entirety of the connector 16, which is contaminated, from the main body 12, a new connector 16 may be inserted into the entrance of the upper cap 20 to be coupled to and locked in the combination hole 38 of the main body 12.

As described above, the entirety of the connector 16, which is (downwardly) disposed on the filter housing 17, which may be contaminated due to the repetitive use of the water purifier may be replaced, thereby improving hygiene of water to be purified.

Here, although the above description has been made with reference to the exemplary embodiment in the present specification described above, it should be appreciated that those skilled in the art may variously modify and change the present specification without departing from the spirit and scope of the present specification as set forth the following claims.

INDUSTRIAL APPLICABILITY

According to the non-electric water purifier of the present disclosure having the above-described configuration, the entirety of a flow path provided between the water-purifying filter and the water outlet cock is replaced, thereby preventing contamination of purified water due to foreign matter, which is harmful to a human body, such as contaminants or bacteria occurring in the flow path. In addition, there is an effect that a user without professional knowledge on a water purifier can personally replace the connector and the water-purifying filter in a one-touch method.

The invention claimed is:

1. A non-electric water purifier comprising:
   a main body having a door formed on one side thereof so as to open and close the main body and having a receiving space part defined therein;
   a connector which is coupled replaceably and rotatably to one side of the main body and comprises a raw water passage connected to a raw water inlet and a purified water passage through which purified water flows;
   at least one filter housing being received in the receiving space part, with a discharge outlet of the filter housing being coupled detachably to the connector;
   a water outlet cock which is connected to a discharge opening of the connector and discharges purified water;
   an upper cap formed in the main body so as to cover an upper part of the connector;
   a stopper formed rotatably in the upper cap such that an inner end of the stopper is detachably coupled to a holding groove formed in an outer circumference of the connector, wherein the inner end of the stopper is removed from the holding groove when pressing an outer end of the stopper; and
   an elastic member which elastically biases a middle side of the stopper pressed outward to an initial state thereof such that the inner end is coupled to the holding groove.

2. The water purifier of claim 1, further comprising:
   a first pocket formed on an inner surface of the door, and
   a magnetic body received in the first pocket so as to maintain a state in which the door closes the main body.

3. The water purifier of claim 1, further comprising:
   a magnetic body received in a second pocket formed on one side of an inner surface of the door, and
   a solenoid valve formed in a raw water introduction tube provided between the raw water inlet and the raw water passage so as to open and close the raw water introduction tube,
   wherein when the magnetic body exceeds a preset distance from a plunger of the solenoid valve due to the opening of the door, the plunger is switched to a close mode so as to close the raw water introduction tube, and when the magnetic body is within the preset distance from the plunger due to the closing of the door, the plunger is switched to an open mode so as to open the raw water introduction tube.

4. The water purifier of claim 1, further comprising:
   wing-shaped first lockers formed symmetrically to each other on an outer surface of the discharge outlet of the filter housing, and
   wing-shaped second lockers formed to face each other on an inner surface of a coupling opening of the connector to which the discharge outlet is coupled,
   wherein a coupling method of the filter housing in which the filter housing is detachably locked in the connector is a rotational coupling method in which the wing-shaped first lockers are detachably locked in the wing-shaped second lockers when the filter housing is rotated at a predetermined angle in a state in which the discharge outlet of the filter housing is inserted into the coupling opening of the connector.

5. The water purifier of claim 1, further comprising:
a push button formed on an outer surface of the connector;
a pair of lockers formed in a coupling opening of the connector such that each of the lockers is moved radially outward according to pressing of the push button; and
an annular holding jaw which is formed on an outer surface of the discharge outlet of the filter housing and is detachably locked by the lockers,
wherein a coupling method of the filter housing detachably locked in the connector is a push button type coupling method.

6. The water purifier of claim 1 or claim 4, further comprising:
guide grooves formed to face each other in an entrance side of the upper cap such that the guide grooves correspond to a reinforcement jaw formed by protruding on an outer side of a coupling opening of the connector, the guide grooves guiding a direction of coupling of the connector to the upper cap when coupling the connector to the upper cap.

7. The water purifier of claim 1, further comprising:
wing-shaped third lockers formed symmetrically to each other on an outer surface of an introduction opening of the connector, and
wing-shaped fourth lockers formed to face each other on an inner surface of a boss-shaped combination hole of the main body to which the introduction opening is coupled,
wherein a coupling method of the connector locked replaceably in the main body is a rotational coupling method in which the wing-shaped third lockers are detachably locked in the wing-shaped fourth lockers when the connector is rotated at a predetermined angle in a state in which the introduction opening of the connector passes through an entrance of an upper cap and is coupled to the combination hole.

8. The water purifier of claim 1, wherein the connector further comprises a purified water passage for a faucet connected to the purified water passage by branching therefrom so as to discharge purified water to a faucet.

9. The water purifier of claim 1, further comprising:
a tray formed detachably on one side surface of the main body so as to collect purified water falling from the water outlet cock.

10. The water purifier of claim 1, further comprising:
a water outlet cock cap configured such that the water outlet cock is detachably coupled to a bottom surface thereof, and
a magnetic body received in a pocket formed on a close contact surface of an opening part of the water outlet cock cap such that the magnetic body is mounted in a seating groove formed in an inner circumference of an opening part of the upper cap.

11. The water purifier of claim 1, wherein the connector further comprises a handle formed on one side surface of the connector by protruding therefrom such that the handle is gripped when the connector is coupled to or removed from an upper cap.

12. The water purifier of claim 3, further comprising:
a check valve formed in a combination hole to which an introduction opening of the connector is detachably coupled, the check valve preventing leakage of raw water when removing the connector from the combination hole.

* * * * *